United States Patent [19]

Kobayashi et al.

[11] Patent Number: 4,770,499
[45] Date of Patent: Sep. 13, 1988

[54] ILLUMINATED LIQUID CRYSTAL DISPLAY APPARATUS WITH BENT, INDICIA-BEARING LIGHT GUIDE

[75] Inventors: Uruo Kobayashi, Tokyo; Youji Oki, Kawasaki; Katsunori Kawano, Tokyo, all of Japan

[73] Assignee: Stanley Electric Co., Ltd., Tokyo, Japan

[21] Appl. No.: 946,978

[22] Filed: Dec. 29, 1986

[30] Foreign Application Priority Data

Jan. 17, 1986 [JP] Japan .............................. 61-4814[U]

[51] Int. Cl.⁴ .............................................. G02F 1/13
[52] U.S. Cl. .............................. 350/345; 350/339 D; 350/339 R
[58] Field of Search ................ 350/339 S, 345, 331 R, 350/339 R

[56] References Cited

U.S. PATENT DOCUMENTS 4,142,781  3/1979  Baur et al. ........................... 350/345
4,184,153  1/1980  Glaubitz ........................... 350/345 X Primary Examiner—Stanley D. Miller
Assistant Examiner—Richard F. Gallivan
Attorney, Agent, or Firm—Frishauf, Holtz, Goodman & Woodward

[57] ABSTRACT

A liquid crystal display apparatus has a back illuminating device which is so arranged that a light emission area of a fluorescent lamp is positioned externally of a reflector, and a light guide is integrally provided at an end thereof with a folded or bent portion, an incident portion at the end of the folded or bent portion extending to that light emission area of the fluorescent lamp which is positioned externally of the reflector, to thereby guide light to a dial or indicator on the light guide.

18 Claims, 1 Drawing Sheet

U.S. Patent  Sep. 13, 1988  4,770,499
FIG. 1
FIG. 2
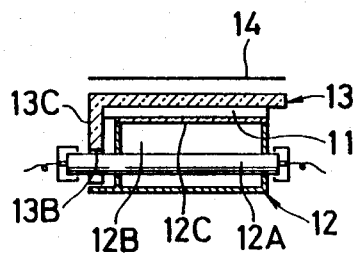
FIG. 3
PRIOR ART
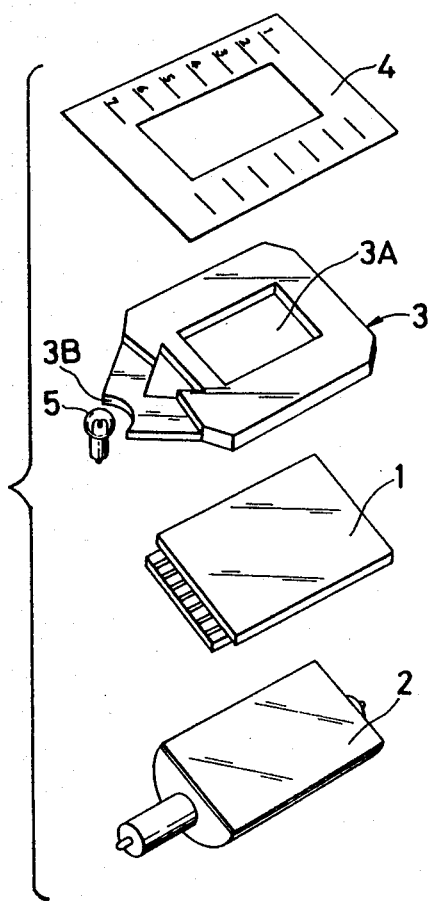

ILLUMINATED LIQUID CRYSTAL DISPLAY APPARATUS WITH BENT, INDICIA-BEARING LIGHT GUIDE

BACKGROUND OF THE INVENTION

1. Field of the Invention

The present invention relates to a liquid crystal display apparatus provided with an illuminated dial or indicator sheet.

2. Description of Prior Art

A conventional liquid crystal display apparatus of this kind (in its exploded state) is shown in FIG. 3. Reference numeral 1 designates a liquid crystal cell, and 2 designates a back illuminating device comprising a combination of a reflector, a fluorescent lamp and a diffusion plate. Reference numeral 3 designates a light guide, 4 a dial sheet, and 5 a dial illuminating light source, for example, a light bulb. The light guide 3 comprises an opening 3A provided in the central portion of a flat plate, the display surface of the liquid crystal cell 1 facing to the opening 3A, and an incident portion 3B formed at one end of the light guide 3 to guide an emission light beam of the bulb 5 to the interior, said dial sheet 4 being attached to the upper surface of the light guide 3. The dial sheet 4 is formed with graduation lines, numerals, etc.

In the thus constructed liquid crystal display apparatus, when the apparatus is used at night, the dial illuminating light source 5 is lighted and the light emission therefrom is incident upon the light guide 3 to bring the graduation lines, numerals, etc. on the dial sheet 4 into relief (i.e., to make them visible). In that state, the liquid crystal cell 1 is actuated to read a display from the graduation lines, etc.

However, in the above-described structure, since the light source 5 is provided separately from the back illuminating device which illuminates the graduations, the number of parts increases, which entails great expense. In the case where a separate bulb is used for the dial illuminating light source 5, there poses a further problem of making it difficult to adjust a graduation illuminating color to a display color of the liquid crystal cell 1.

OBJECT OF THE INVENTION

It is an object of the present invention to provide a back illuminated liquid crystal display apparatus provided with a dial which can utilize a part of the light emission of a back illuminating device for illumination of a dial.

SUMMARY OF THE INVENTION

According to the present invention, a liquid crystal display apparatus comprises a liquid crystal cell having a display surface; a back illuminating device for illuminating the liquid crystal cell, the back illuminating device comprising a light source and a reflector for reflecting light from the light source toward the liquid crystal cell; light guide means defining a light path, and having an opening to which the display surface of the liquid crystal cell faces; and dial means on a surface of at least a portion of the light guide means forming the light path, for illumination of the dial means. The improvement of the present invention is that the light source of the back illuminating device is so arranged that a portion of a light emission area of the light source is positioned externally of the reflector; and that the light guide means comprises a folded or bent portion which is folded or bent relative to the portion of the light guide means which carries the dial means thereon, the folded or bent portion extending to the vicinity of the portion of the light emission area of the light source which is positioned externally of the reflector.

BRIEF DESCRIPTION OF THE DRAWINGS

FIG. 1 is a sectional view showing one embodiment of a liquid crystal display apparatus according to the present invention;

FIG. 2 is an exploded perspective view of the apparatus of FIG. 1; and

FIG. 3 is an exploded perspective view showing a conventional apparatus.

DETAILED DESCRIPTION OF THE INVENTION

FIGS. 1 and 2 show one embodiment of the present invention. Reference numeral 11 designates a liquid crystal cell, and 12 designates a back illuminating device comprising a fluorescent lamp 12A, a reflector 12B and a diffusion plate 12C, said illuminating device 12 being arranged at the rear of the liquid crystal cell. The arrangement of parts is such that a part of the fluorescent lamp 12A is positioned externally of the reflector 12B.

Reference numeral 13 designates a light guide, and reference numeral 14 designates a dial sheet or graduation sheet (hereinafter called "graduation sheet") formed with graduation lines, characters, etc. The light guide 13 has a flat plate portion having an opening 13A to which display surface of the liquid crystal cell 11 faces in the central portion thereof, and a folded or bent portion 13C continuous to (i.e., integral with) one end of the flat plate portion. As seen in FIG. 2, the folded or bent portion is substantially perpendicular to the flat plate portion. An incident portion 13B at the end of folded or bent portion 13C reaches a light emission area of the portion of the fluorescent lamp 12A which is positioned externally of the reflector 12B for picking up light from the externally positioned portion of lamp 12A. The graduation sheet 14 is attached to the upper surface of the flat plate portion of light guide 13.

With the arrangement as described above, the greater part of the light emission from the fluorescent lamp 12A as a light source of the back illumination is reflected by the reflector 12B and is incident upon the diffusion plate 12C, which emission is turned into a light whose brightness is substantially even to evenly illuminate the liquid crystal cell 11. This light may be transmitted or interrupted depending on the presence or absence of an electric field of the liquid crystal cell 11 to provide the desired display.

In this case, the light from lamp portions other than those facing the reflector 12B in the emission area of the fluorescent lamp 12A enters into the light guide 13 from the incident portion 13B of the light guide 13, and reaches the light path around the opening 13A through the folded or bent portion 13C, which light illuminates the graduation sheet 14 attached to the surface of light guide 13. This illumination brings the graduation lines into relief to enable reading of a display of the liquid crystal cell 11. Thus, the display of the liquid crystal cell and the illumination of graduations are provided by the emission from the single fluorescent lamp which is one and the same light source, thus improving the color rendering properties.

It will be noted that a color filter may be mounted on an emission portion externally of the reflector 12B of the fluorescent lamp 12A, and a reflector may be mounted in order to efficiently guide the light emission to the light guide 13.

As described above, according to the present invention, the fluorescent lamp of the back illuminating device is combined with the reflector so that a part of the light emission area thereof is positioned externally of the reflector, and a folded or bent portion is provided at the end of the light guide so that an incident portion of the light guide may face the light emission portion of the fluorescent lamp which is positioned externally of the reflector.

Therefore, a part of the light emission from the back illuminating device may be used for illumination of the graduations, thus reducing the number of parts and lowering the cost as well as improving the color rendering properties. Moreover, since the light source merely comprises a fluorescent lamp, heat generation may be minimized to contribute to stabilization of operation of the liquid crystal cell.

What is claimed is:

1. A liquid crystal display apparatus comprising:
    a liquid crystal cell having a display surface;
    a single light source means arranged for back illuminating said liquid crystal cell, said single back illuminating light source means comprising a light emitting means for emitting light, and a reflector means for reflecting light emitted from said light emitting means toward said liquid crystal cell;
    light guide means for defining a light path, and having an opening to which said display surface of said liquid crystal cell faces;
    dial means carried on a surface of at least a portion of said light guide means forming said light path, such that said light guide means illuminates said dial means;
    said single back illuminating light source means being arranged such that a portion of a light emission area of said light emitting means is positioned externally of said reflector means; and
    said light guide means comprising a folded or bent portion which is folded or bent relative to the portion of said light guide means which carries said dial means thereon, said folded or bent portion extending to the vicinity of said externally positioned portion of said light emission area of said light emitting means which is positioned externally of said reflector means so as to receive light from said externaly positioned portion of said light emission area of said light emitting means and to transmit said received light to said surface portion of said light guide means which carries said dial means thereon, for thereby illuminating said dial means;
    said dial means comprising a sheet having graduations or the like thereon, said sheet being attached to a lighted surface portion of said light guide means.

2. The liquid crystal display apparatus of claim 1, wherein said folded or bent portion of said light guide means includes an incident portion at an end thereof closest to said externally positioned portion of said light emission area of said light emitting means for receiveing light emitted by said light source means.

3. The liquid crystal display apparatus of claim 2, wherein said light emitting means comprises a fluorescent lamp.

4. The liquid crystal display apparatus of claim 3, wherein said single back illuminating light source means further comprises a diffusion plate between said light emitting means and said liquid crystal cell for substantially evenly illuminating said liquid crystal cell.

5. The liquid crystal display apparatus of claim 1, wherein said single back illuminating light source means further comprises a diffusion plate between said light emitting means and said liquid crystal cell for substantially evenly illuminating said liquid crystal cell.

6. The liquid crystal display apparatus of claim 1, wherein said light emitting means comprises a fluorescent lamp.

7. The liquid crystal display apparatus of claim 6, wherein said single back illuminating light source means further comprises a diffusion plate between said light emitting means and said liquid crystal cell for substantially evenly illuminating said liquid crystal cell.

8. The liquid crystal display apparatus of claim 1, wherein said light path defined by said guide means extends around the periphery of said opening of said light guide means.

9. The liquid crystal display apparatus of claim 1, wherein said folded or bent portion of said light guide means is substantially perpendicular to the portion of said light guide means which carries said dial means thereon.

10. The liquid crystal display apparatus of claim 9, wherein said folded or bent portion of said light guide means is integrally formed with that portion of said light guide means which carries said dial means thereon.

11. The liquid crystal display apparatus of claim 10, wherein said portion of said light guide means which carries said dial means thereon is substantially flat.

12. The liquid crystal display apparatus of claim 1, wherein said portion of said light guide means which carries said dial means thereon is substantially flat.

13. The liquid crystal display apparatus of claim 1, wherein said folded or bent portion of said light guide means is integrally formed with that portion of said light guide means which carries said dial means thereon.

14. The liquid crystal display apparatus of claim 13, wherein said portion of said light guide means which carries said dial means thereon is substantially flat.

15. A liquid crystal display apparatus comprising:
    a liquid crystal cell having a display surface;
    a back illuminating device for illuminating said liquid crystal cell, said back illuminating device comprising a light source means for emitting light and a reflector means for reflecting light emitted from said light source toward said liquid crystal cell;
    light guide means defining a light path, and having an opening to which said display surface of said liquid crystal cell faces; and
    dial means on a surface of at least a portion of said light guide means forming said light path, for illumination of said dial means;
    said light source means of said back illuminating device being arranged such that a portion of a light emission area of said light source means is positioned externally of said reflector means;
    said light guide means comprising a folded or bent portion which is folded or bent relative to the portion of said light guide means which carries said dial means thereon, said folded or bent portion extending to the vicinity of said portion of said light emission area of said light source means which is positioned externally of said reflector means; and said dial means comprising a sheet-like member having indicia thereon, and said sheet-like member being attached to a lighted surface portion of said light guide means.

16. The liquid crystal display apparatus of claim 15, wherein said folded or bent portion of said light guide means includes an incident portion at an end thereof closest to said light source means for receiving light emitted by said light source means.

17. The liquid crystal display apparatus of claim 15, wherein said light path defined by said light guide means extends around the periphery of said opening of said light guide means.

18. The liquid crystal display apparatus of claim 15, wherein said folded or bent portion of said light guide means is integrally formed with that portion of said light guide means which carries said dial means thereon.

* * * * *